May 6, 1947.   J. McAFEE   2,420,145
PROCESS FOR CONVERSION OF HYDROCARBONS
AT HIGH CRACKING TEMPERATURE
Filed March 12, 1943
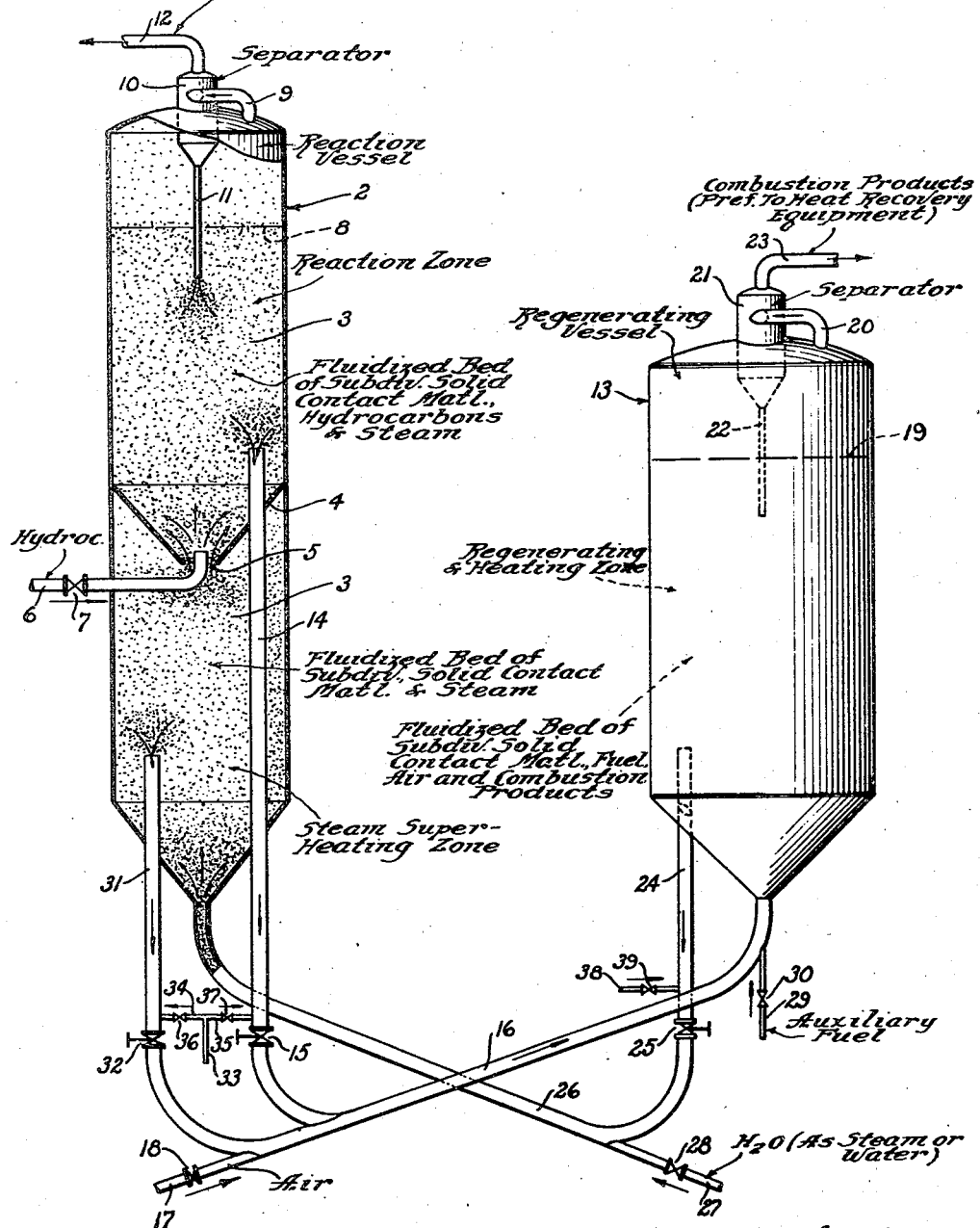
Inventor:
Jerry McAfee
By: Lee J. Gary
Attorney Patented May 6, 1947

2,420,145

UNITED STATES PATENT OFFICE 2,420,145

PROCESS FOR CONVERSION OF HYDROCARBONS AT HIGH CRACKING TEMPERATURE

Jerry McAfee, Riverside, Ill., assignor to Universal Oil Products Company, Chicago, Ill., a corporation of Delaware Application March 12, 1943, Serial No. 478,935

7 Claims. (Cl. 260—680)

This invention is directed to an improved process of the type wherein reactants to be treated or converted are contacted with a mass of solid material in which the heat required for conducting the desired reaction has been stored.

The features of the invention are particularly directed to a process for the thermal decomposition of hydrocarbons at relatively high temperature and low effective pressure to produce lighter and more valuable hydrocarbons, such as butadiene, acetylene, etc. The subsequent description will therefore be directed principally to this particular reaction, but certain features of the invention will be found advantageous in numerous other contact reactions of the general type first mentioned above and are therefore not limited to use in conducting any specific reaction.

The reaction whereby hydrocarbons are thermally decomposed in an operation employing relatively high cracking temperature, low pressure and short conversion time is well known. To obtain the desired operating conditions it has been common practice to employ recuperative heaters containing a static bed or checker-work of fire clay shapes or other refractory solid in which heat for conducting the reaction is periodically stored by burning fuel in contact with the refractory material. For continuous operation, two or more such heaters are utilized and are each alternately operated as a reaction zone, through which the hydrocarbon reactants and resulting conversion products are passed in contact with the heated refractories, and as a combustion zone in which fuel is burned to store heat in the refractories. Heavy carbonaceous or hydrocarbonaceous deposits accumulated in the refractory mass during the conversion reaction serve as fuel for heating the refractories in the combustion step of the process. The operation is characterized by relatively short processing steps with frequent periods of reheating. This is necessitated by the rapidly decreasing temperature of the refractory mass as the conversion period progresses and by the relatively large amount of carbonaceous deposits which tend to foul the refractory mass.

In the improved operation provided by the invention, as applied to the type of reaction above mentioned, I employ a moving mass of finely subdivided solid contact material of a refractory nature and circulate the same in series through and between a confined reaction zone and a separate confined combustion zone, whereby the carbonaceous deposits are continuously burned from the contact material and the latter is continuously heated and supplied in heated state to the reaction zone to maintain a substantially uniform temperature in the latter. In this improved operation there is no periodic switching of the reactants from one vessel to another, the reaction zone being continuously operated for conversion of the hydrocarbons and the combustion zone being continuously operated for heating the contact material.

In the preferred embodiment of the invention, the bed of subdivided solid contact material in the reaction zone and the bed of the subdivided solid contact material in the combustion zone are maintained in turbulent fluid-like condition resembling that of a boiling liquid. In the reaction zone, this fluid-like condition of the bed of contact material is obtained by passing the fluid hydrocarbon reactants and resulting vaporous and gaseous conversion products through the bed at a net upward velocity greater than that of the subdivided solid material comprising the bed. As applied to the combustion zone, the fluidizing medium comprises air or other oxygen-containing gas employed to support combustion of the fuel. The turbulent fluid-like condition of the beds results in the substantially uniform distribution of heat throughout the reaction zone and throughout the combustion zone, and, in combination with the provision for continuous circulation of the contact material between the reaction and the regenerating zones, it permits the continuous operation of the process at a substantially constant and optimum temperature level.

The production of valuable light hydrocarbons, such as butadiene and acetylene, by the high temperature cracking of heavier hydrocarbons (either normally liquid or normally gaseous) is best accomplished at low pressure (substantially atmospheric or preferably sub-atmospheric) and with a relatively short time of exposure for the hydrocarbons to the high temperatures employed. A fluidized bed of contact material in the reaction zone, as provided by the invention, is advantageous in that it reduces the pressure drop encountered by the hydrocarbons in passing through the bed, as compared with the pressure drop encountered in a static bed, and thus permits operation at a lower effective pressure. With the bed of contact material in fluidized condition, the reaction zone may be operated at a gauge pressure only slightly above atmospheric without the use of a costly vacuum pump or exhauster for the outgoing products and, by introducing steam or other relatively inert gas to the reaction zone, a partial pressure for the hydrocarbon reactants well below atmospheric may be achieved.

Steam or other relatively inert gas to produce a partial pressure effect and reduce the effective operating pressure has been previously used in reactions of the type above mentioned employing a stationary mass of solid refractory or contact material. The disadvantage of using steam in such operations is due to the additional equipment and expense involved in generating and superheating the large volumes of high temperature steam required. The use of other relatively inert gas involves the cost of compressing and heating the same for injection into the reaction zone. As a special feature of the invention, the same equipment which is utilized for conducting the conversion reaction and for reheating the subdivided solid contact material may be employed for the generating and/or superheating of the steam utilized in the reaction zone. This is accomplished by introducing water or low temperature steam into contact with the hot subdivided solid material passing from the combustion zone to the reaction zone. Heat thus imparted to the water or low temperature steam results in the production of superheated steam which is supplied to the reaction zone with the contact material and, in one embodiment of the invention, the steam thus generated or superheated serves as a transporting fluid which, by its gas lift action, effects transfer of the subdivided solid contact material from the combustion zone to the reaction zone.

When liquid hydrocarbons of the nature of gas oil or heavier are employed as the charging stock, combustion of the heavy hydrocarbonaceous deposits accumulated on the contact material may store a sufficient quantity of heat in the latter to satisfy the requirements of the endothermic hydrocarbon conversion reaction. In other instances, and particularly when substantial quantities of steam are employed in the reaction zone, the additional heat necessary for conducting the conversion reaction and for bringing the steam to the required high reaction temperature may be stored in the contact material by burning additional fuel from an external source in the combustion zone and by circulating the subdivided solid contact material through the system at a sufficiently rapid rate to transfer the required heat from the combustion zone to the reaction zone.

In the preferred embodiment of the invention, I employ the lower portion of the reaction vessel as a steam superheating zone and establish a local cycle of contact material from this zone to the combustion zone and back to the steam superheating zone, in addition to circulating contact material from a higher point in the reaction vessel to and through the combustion zone and thence back through the steam superheating zone to the reaction zone. This, in conjunction with burning of the required additional fuel in the combustion zone makes possible the transfer of any desired quantity of heat from the combustion zone to the reaction zone without excessively rapid circulation of the contact material through the reaction zone. In other words, the desired residence time for the contact material in the zone wherein it contacts the hydrocarbons to be converted may be maintained independently of the rate of circulation required to effect superheating of the steam employed.

The features and advantages of the invention are further explained in conjunction with the following description of the accompanying diagrammatic drawing.

The drawing is an elevational view, shown partially in section, one specific form of apparatus employing the features of the invention and in which the improved process provided by the invention may be conducted.

Referring to the drawing the reaction vessel is designated by the reference numeral 2 and comprises an elongated, vertically disposed, substantially cylindrical vessel within which is disposed a fluidized bed of subdivided solid contact material indicated at 3. In the particular instance illustrated the reaction vessel is divided by a partition 4 comprising an inverted truncated cone into an upper section, wherein the hydrocarbon reactants to be converted and resulting conversion products contact the fluidized bed of subdivided solid material, and a lower section, designated in the drawing as a steam superheating zone, into which low temperature steam or liquid water is introduced and wherein the steam supplied to or generated therein is heated to approximately the temperature desired for conducting the hydrocarbon conversion reaction by its contact with the fluidized bed of subdivided solid contact material maintained within this zone.

High temperature steam and subdivided solid contact material from the fluid bed in the lower section of the reaction vessel are directed through the central opening 5 in partition 4 into the upper section of the fluid bed, and the hydrocarbons to be converted are also introduced through line 6 and valve 7 into the lower portion of this upper section of the fluid bed. The hydrocarbons may be supplied to the reaction zone in preheated or in relatively cold state and in either liquid, vaporous or gaseous condition or in mixed phase.

The net upward velocity of the steam and of the hydrocarbon vapors and gases passing through the reaction vessel is greater than the net upper velocity of the particles of subdivided solid contact material. This results in the phenomenon known as "hindered settling" whereby the bed of solid particles is maintained in a turbulent fluid-like condition resembling that of a boiling liquid. This results in thorough and intimate mixing of the steam and solid particles in the lower section of the reaction vessel and thorough mixing of the steam and solid particles with the hydrocarbons in the upper section of the vessel, so that a substantially uniform temperature prevails in each of these zones and, due to the dispensed condition of the beds of solid particles, relatively low pressure drop is encountered by the steam, hydrocarbon reactants and resulting fluid conversion products in passing through the bed.

The concentration of solid particles in the upper portion of the fluid bed is materially less than their concentration in the lower portion of the bed. Thus the bed has a relatively light upper phase and a relatively heavy or more dense lower phase, the approximate line of demarkation between the light and dense phases in the reaction zone being indicated by the broken line 8.

Vaporous and/or gaseous hydrocarbon conversion products, steam and entrained solid particles are directed from the upper portion or light phase of the fluid bed in the reaction zone through line 9 to suitable separating equipment such as, for example, the cyclone separator indicated at 10, wherein all or a major portion of the solid particles are centrifugally separated from the vapors and gases and from which the separated solid material is returned through conduit 11 to the dense phase of the fluid bed. Steam and hydrocarbon conversion products are directed from separator 10 through line 12 to suitable fractionating, condensing and recovery equipment which is not a novel part of the present process and it is therefore not illustrated. Due to the relative high heat content of this outgoing stream it preferably passes through suitable heat recovery equipment such as a hot gas turbine, waste heat boiler or other heat exchanger wherein readily available heat is recovered therefrom for any desired useful purpose. When desired heat thus recovered may be utilized to preheat the hydrocarbons being supplied to the reaction zone through line 6 and valve 7.

Deleterious heavy conversion products of a carbonaceous or a hydrocarbonaceous nature are formed in the reaction zone and deposited on the particles of subdivided solid contact material comprising the fluid bed maintained in this zone. These combustible deposits are burned from the contact material in the regenerating vessel 13, to which contaminated contact material is continuously supplied from the reaction vessel and therefrom resulting heated contact material is continuously returned to the reaction vessel. To effect the transportation of contaminated solid particles from the dense phase of the fluid bed in the upper section of the reaction vessel a column thereof is passed downwardly through standpipe 14 and through a suitable restriction, such as the adjusted orifice represented by valve 15 disposed adjacent the lower end of the standpipe, into transfer line 16 wherein solid particles are commingled with a stream of air or other oxygen-containing gas introduced to line 16 through line 17 and valve 18. The oxidizing gas transports the solid particles into the lower portion of the regenerating vessel by its gas-lift action and keeps the bed of subdivided solid material maintained in this vessel in a turbulent fluid-like condition resembling that of the boiling liquid. The air or other oxidizing gas thus supplied to the regenerating vessel also supports combustion of the carbonaceous or the hydrocarbonaceous deposits on the contact material with the result that the solid particles are heated to a high temperature in the regenerating zone. The turbulent fluid-like condition of the bed results in a substantially uniform temperature throughout the latter and reduces the resistance offered to the flow of gases therethrough and the resulting pressure drop encountered by the gases, as compared with that which would be encountered in a stationary bed.

The fluid bed in the regenerating zone, like that in the reaction zone, comprises a relatively dense lower phase and a substantially less dense upper phase, the approximate line of demarkation between the light and dense phases being indicated by the broken line 19. Combustion gases and suspended solid particles are directed from the upper portion or light phase of the fluid bed in the regenerating zone through line 20 to suitable separating equipment such as, for example, the cyclone separator indicated at 21. Resulting separated solid particles are returned through conduit 22 to the dense phase of the fluid bed in the regenerating zone and combustion gases are directed from separator 21 through line 23, preferably to suitable heat recovery equipment of a desired type, not illustrated, wherein readily available heat is recovered therefrom for use within the system or elsewhere as desired.

Hot subdivided solid material from the fluid bed in the regenerating zone is returned via the steam superheating zone in the reaction vessel to the upper or reaction section of the vessel and serves to superheat the steam utilized in the reaction zone to or somewhat above the desired reaction temperature before it comes into contact with the hydrocarbon reactants.

To effect the transportation of subdivided solid contact material from the fluid bed in the regenerating zone to the fluid bed in the steam superheating zone a column thereof is directed downwardly from the dense phase of the fluid bed in the regenerating zone through standpipe 24 and through a suitable restriction, such as the adjusted orifice indicated as a valve and designated by the reference numeral 25, disposed adjacent the lower end of standpipe 24, into transfer line 26. The hot solid particles are commingled in line 26 with water or low temperature steam supplied thereto through line 27 and valve 28. The water and/or steam serves as a transporting fluid for the solid particles through the transfer line and the mixture is directed therefrom upwardly into the lower portion of the fluid bed in the steam superheating zone.

When low temperature or saturated steam is supplied to the transfer line 26, the hot solid contact material with which it is commingled in this line and in the lower portion of the fluid bed in the reaction vessel serves to heat it substantially to or above the desired reaction temperature to be employed for converting the hydrocarbons before the steam comes into contact with the latter in the reaction zone. When liquid water is supplied to the transfer line it is vaporized in the latter and/or the lower section of the fluid bed in the reaction vessel and the resulting steam is superheated to the desired temperature prior to its contact with the hydrocarbon reactants.

Highly heated steam and solid contact material pass from the steam superheating section or the reaction vessel into the reaction zone and in passing through the latter maintains the desired reaction temperature for converting the hydrocarbons in this zone. The steam also serves, by its partial pressure effect, to materially reduce the effective pressure at which the hydrocarbon conversion reaction is conducted. By thus employing steam a partial pressure for the hydrocarbons substantially below atmospheric may be obtained in the reaction zone even when the latter is operated at a gauge pressure materially above atmospheric.

As previously explained, the combustible deposits on the contact material in the reaction zone will in many instances not supply, upon their combustion, sufficient heat to maintain the desired reaction temperature in the reaction zone and to heat the steam employed to the desired temperature. In such instances regulated quantities of additional fuel from an external source are supplied to and burned in the regenerating vessel in contact with the fluidized bed of subdivided solid material in this zone. Provision is made in the case here illustrated for introducing the required auxiliary fuel into the regenerating vessel through line 29 and valve 30. The fuel employed may be either liquid, gaseous or powdered solid fuel, gaseous or liquid fuel being ordinarily preferred rather than a solid fuel of high ash content.

When substantial quantities of steam are utilized in the reaction zone a large portion of the total heat required for conducting the process will be utilized in its generation and in bringing it to desired reaction temperature. Since this heat is carried to a large extent by the solid particles, the rate at which the latter are circulated through the reaction and regenerating vessels can be controlled to obtain any desired degree of superheat for any reasonable quantity of steam, providing sufficient fuel is burned in the regenerating vessel. A special feature of the invention, which should not be construed as limiting its broader aspects, provides for maintaining a local cyclic flow of subdivided solid material between and through the steam superheating zone and of the regenerating zone without passing of the same through the reaction zone. By means of this provision the residence time and rate of circulation of the subdivided solid contact material through the reaction zone, wherein it contacts the hydrocarbons, may be controlled independently of the rate of circulation required to superheat the steam. This independent control is a highly desirable and advantageous feature of the invention.

Local circulation of contact material from the steam superheating zone to the regenerating zone is accomplished by directing a column thereof from the fluid bed in the steam superheating zone through standpipe 31 and through a suitable restriction, such as the adjusted orifice or valve indicated at 32, into transfer line 16 wherein this material, as well as that supplied to the transfer line through stand-pipe 14, is commingled with the oxidizing gas introduced through line 17 and valve 18 and is transported thereby to the fluid bed in the regenerating vessel. Obviously, when desired, a separate transfer line may be employed for the solid material supplied from the reaction zone to the regenerating zone and for the solid material supplied from the steam superheating zone to the regenerating zone.

To prevent excessive compaction of the solid particles in the columns thereof passing through lines 14, 24 and 31, relatively small quantities of suitable inert gas, such as steam, for example, may be introduced into these columns at one or a plurality of suitable points on the up-stream side of the respective valves 15, 25 and 32, to flow upwardly through the columns countercurrent to the descending solid particles. Such gas may be introduced to standpipes 14 and 31 through line 33 and the respective branch lines 34 and 35 controlled respectively by valves 36 and 37, and may be introduced to standpipe 24 through line 38 and valve 39.

In conducting operations of the type to which the invention is particularly directed, namely, the high temperature cracking of hydrocarbons to produce more valuable normally gaseous fractions, including butadiene, acetylene, etc., the operating conditions will depend, of course, upon the particular nature of the charging stock employed, the product or products desired and the nature of the subdivided solid contact material, and these conditions may be selected to suit requirements. It is not the purpose of this disclosure to define optimum operating conditions for each of the wide variety of charging stocks, catalysts or inert contact masses which may be employed, nor for specific reactions which may be conducted within the scope of the invention, since the invention is believed to reside in the novel and advantageous features above outlined, rather than in the use of specific operating temperatures, pressures and the like.

In general, suitable operating conditions will correspond quite closely to those which have been previously utilized in conducting reactions of the same general type in a fixed bed process, in so far as fixed bed and fluid bed operations are comparable. However, the use of a fluid-like bed of contact material, as well as the use of steam, as herein provided, permits lower effective operating pressures in the reaction zone than have heretofore been obtainable with good economy in fixed bed operations. This favors the production of highly olefinic gases from either normally liquid or normally gaseous charging stocks and results in higher yields of the desired products under otherwise suitable operating conditions, or at least reduces the yields of undesired products normally formed at higher pressures by undesirable secondary and side reactions.

To indicate the possible range of operating conditions we will consider, for example, the high temperature treatment of hydrocarbon distillates, such as kerosene or kerosene distillate, naphtha, light gas oil and the like to produce appreciable yields of butadiene, employing relatively inert contact material, such as fine particles of fire-clay, quartz, silica or the like, which acts as a receptor for the combustible deposits and as a means of transferring heat from the exothermic regenerating step to the endothermic reaction. The temperature employed in the reaction zone may range, for example, from 1100 to 2000° F., or more. In fact its upper limit is fixed for practicable purposes, more by the available materials of construction than by other consideration.

A weight ratio of solid contact material to oil entering the reaction zone per hour, ranging from 20:1 to 50:1, or thereabouts, is preferably employed, although it may within the scope of the invention be as low as 5:1 or as high as 100:1.

I preferably employ sufficient steam to give an effective pressure of not more than a few pounds above atmospheric in the reactor, and substantial sub-atmospheric effective pressures give best rest results. The actual gauge pressure in the reactor may range from 50 pounds, or thereabouts, to as low as can be conveniently obtained. The molal ratio of steam to oil in the reaction zone may range from 1:1 to 10:1 or thereabouts, depending upon the gauge pressure at which it is desired to operate the reactor, a low gauge pressure obviously permitting the use of less steam for the same effective operating pressure.

The average residence time for the solid contact material in the reaction zone is correlated with the ratio of solid contact material to oil entering the reaction zone and is maintained at a sufficiently low value to prevent the excessive accumulation of heavy deposits on the catalyst, which would retard heat transmission to the fluid reactants and cause agglomeration of the solid particles. On the other hand, it must be high enough that the heated solid material will transmit the necessary heat to the hydrocarbon reactants. A suitable average residence time will normally be within the range of 5 to 30 minutes, depending primarily upon the coke-forming characteristics of the charging stock and the density of the contact material.

By virtue of the provisions of the invention the ratio of solid contact material to oil in the reaction zone is controllably independent of the ratio of contact material to steam. The latter may be the same as the ratio of contact material to oil or as much higher or lower as is required.

I claim as my invention:

1. A process for the conversion of hydrocarbons at high cracking temperature and low pressure to produce more valuable normally gaseous hydrocarbons, including butadiene, which comprises continuously circulating a mass of subdivided solid contact material between and through a confined reaction zone, a confined combustion zone and a confined steam superheating zone in series and in the order named, effecting said conversion of the hydrocarbons in said reaction zone by their contact with the mass of subdivided solid material passing therethrough, with the resulting deposition of combustible contaminants on the contact material, burning said combustible contaminants from the contact mass in the combustion zone by contacting the same with oxidizing gas, thereby heating the contact mass to a high temperature, passing steam through the steam-superheating zone and therein heating the same to substantially the temperature desired for conducting said hydrocarbon conversion reaction by its contact therein with hot contact material supplied thereto from the combustion zone, and passing the resulting highly heated steam through the reaction zone in admixture with said hydrocarbons.

2. A process such as defined in claim 1, wherein regulated quantities of fuel from an external source are supplied to and burned in the combustion zone in direct contact with said mass of subdivided solid material therein, whereby to store additional heat to the latter and supply the same therewith to the steam-superheating and, at least in part, to the reaction zones.

3. A process such as defined in claim 1, wherein said steam is generated by commingling water with the mass of hot subdivided solid contact material passing from the combustion zone to the steam-superheating zone.

4. A process such as defined in claim 1, wherein a local cyclic flow of subdivided solid material is maintained between and through the combustion and steam-superheating zones in addition to said cyclic flow thereof between and through all three of said zones.

5. The process of claim 1 further characterized in that said subdivided solid contact material is maintained in each of said reaction and said combustion zones in the form of a turbulent fluidized bed resembling a boiling liquid.

6. The process of claim 1 further characterized in that a stream of said oxidizing gas is employed to effect the transfer of contaminated contact material from said reaction zone to said combustion zone.

7. The process of claim 1 further characterized in that said contact material is transferred from said superheating zone to said reaction zone in suspension in said highly heated steam formed in said superheating zone.

JERRY McAFEE.

REFERENCES CITED

The following references are of record in the file of this patent:

UNITED STATES PATENTS

| Number | Name | Date |
|---|---|---|
| 2,307,240 | Ruthruff | Jan. 5, 1943 |
| 2,310,523 | Groll et al. | Feb. 9, 1943 |
| 2,325,516 | Holt et al. | July 27, 1943 |
| 2,310,907 | McMillan | Feb. 9, 1943 |
| 2,369,281 | Chaney | Feb. 13, 1945 |
| 2,367,622 | Schulze et al. | Jan. 16, 1945 |
| 2,367,623 | Schulze et al. | Jan. 16, 1945 |
| 2,259,487 | Payne | Oct. 21, 1941 |
| 2,377,935 | Gunness | June 12, 1945 |
| 2,393,636 | Johnson | Jan. 29, 1946 |